United States Patent
Shih et al.

(10) Patent No.: US 8,200,981 B2
(45) Date of Patent: Jun. 12, 2012

(54) DATA TRANSMISSION DEVICE AND DATA TRANSMISSION SYSTEM

(75) Inventors: Cheng-Tai Shih, Taipei Hsien (TW); Bao-Qin Xu, Shenzhen (CN); Hua Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 650 days.

(21) Appl. No.: 12/334,546

(22) Filed: Dec. 15, 2008

(65) Prior Publication Data

US 2010/0031053 A1    Feb. 4, 2010

(30) Foreign Application Priority Data

Aug. 1, 2008  (CN) .......................... 2008 1 0303317

(51) Int. Cl.
*G06F 21/00* (2006.01)
(52) U.S. Cl. ....................................................... 713/186
(58) Field of Classification Search .................. 713/156, 713/186; 382/115–118
See application file for complete search history.

(56) References Cited

U.S. PATENT DOCUMENTS

| | | | |
|---|---|---|---|
| 7,231,070 B2 * | 6/2007 | Bjorn et al. | 382/124 |
| 2003/0005336 A1 * | 1/2003 | Poo et al. | 713/202 |
| 2007/0250718 A1 * | 10/2007 | Lee et al. | 713/186 |
| 2008/0126809 A1 * | 5/2008 | Rothschild | 713/186 |
| 2009/0070593 A1 * | 3/2009 | Boshra et al. | 713/186 |
| 2009/0164797 A1 * | 6/2009 | Kramer | 713/186 |
| 2010/0049987 A1 * | 2/2010 | Ettorre et al. | 713/186 |
| 2010/0268961 A1 * | 10/2010 | Cole et al. | 713/186 |

FOREIGN PATENT DOCUMENTS

CN  1996269 A   7/2007

* cited by examiner

*Primary Examiner* — Gilberto Barron, Jr.
*Assistant Examiner* — Virginia T Ho
(74) *Attorney, Agent, or Firm* — Altis Law Group, Inc.

(57) ABSTRACT

A data transmission device for secure biometric transmission includes first and second input-output units, and a biometric identification apparatus. The input-output units electrically connect to one of the two electronic devices, respectively. The biometric identification unit is configured for electrically interconnecting the first and second input-output units, receiving a biometric input, outputting biometric data in response to the biometric input, and encrypting the biometric data to be transmitted to one of the electronic device having a storage unit.

3 Claims, 4 Drawing Sheets

DATA TRANSMISSION DEVICE AND DATA TRANSMISSION SYSTEM

BACKGROUND

1. Technical Field

The disclosure relates to data transmission devices and, particularly, to a biometric data transmission device and method for transmitting and verifying biometric identification.

2. Description of the Related Art

Portable electronic devices, such as notebooks or personal digital assistants (PDAs), employ a variety of identification technologies to ensure information security. Among these identification technologies, fingerprint-based identification is the oldest method. This method requires that the portable electronic device be equipped with an additional fingerprint sensor and requisite programs. As a consequence, costs and burdens on system resources are increased.

Therefore, it is desirable to provide a biometric data transmission device and a transmission method thereof which can overcome the described limitations.

DETAILED DESCRIPTION OF EMBODIMENTS

Embodiments of a biometric data transmission device and method are described in detail here with reference to the drawings.

Figure 1:
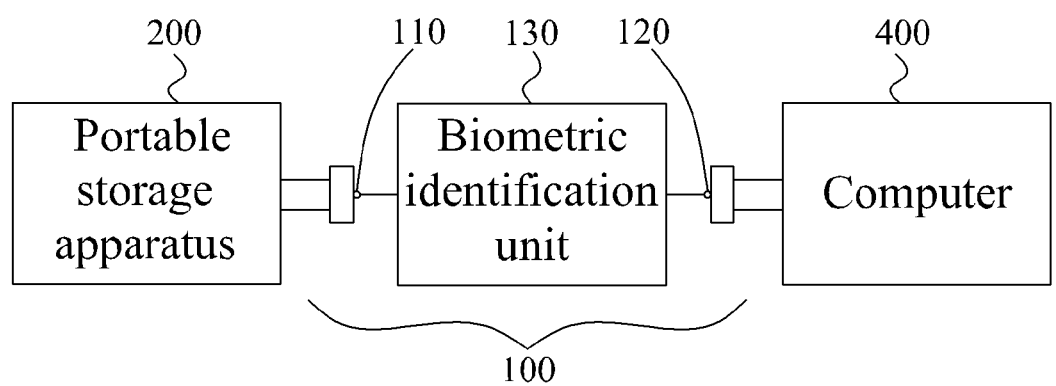
FIG. 1 is a schematic block diagram of a biometric data transmission device, connected to a portable storage apparatus and a computer, according to a first exemplary embodiment.
Figure 2:
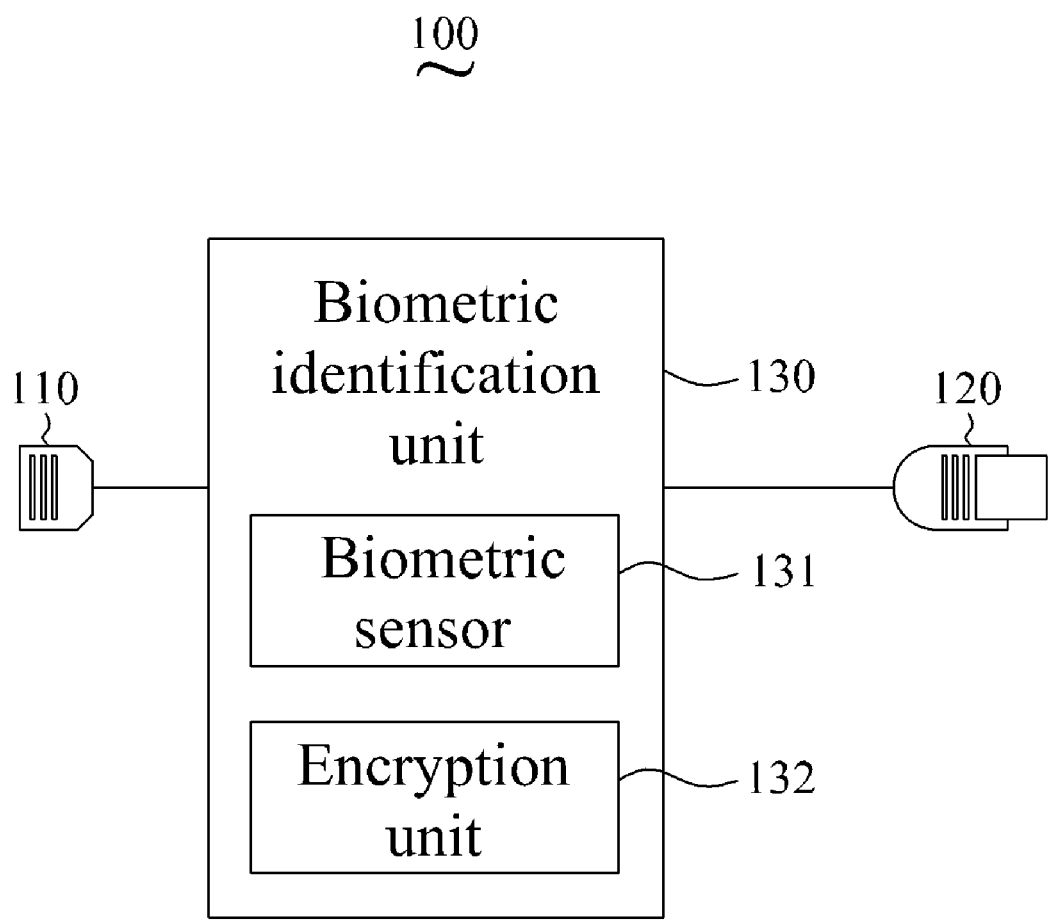
FIG. 2 is a schematic block diagram of the biometric data transmission device of FIG. 1.

Referring to FIGS. 1-2, a data transmission device 100 interconnected to a portable storage apparatus 200 and a computer 400 includes a first input-output (IO) unit 110, a second IO unit 120, and a biometric identification unit 130 interconnected to the first and second IO units 110, 120 via a cable. The computer 400 is configured for coordinating the data transmission device 100, the portable storage apparatus 200.

The first and second IO units 110, 120 are interfaces conforming to the Universal Serial Bus (USB) standard. The first and second IO units 110, 120 can be a male or female interface, depending on a corresponding port type.

Also referring to FIG. 2, the biometric identification unit 130 includes a biometric sensor 131 and an encryption unit 132. The biometric sensor 131 is configured for receiving a biometric input such as a scanned fingerprint and outputting biometric data in response thereto, here as an example, the biometric sensor 131 being a semiconductor sensor which can detect the biometric input upon contact therewith.

The encryption unit 132 is configured for encrypting the biometric data for transmission to the portable storage apparatus 200. In detail, the encryption can be controlled by the computer 400 (shown in FIG. 1).

Figure 3:
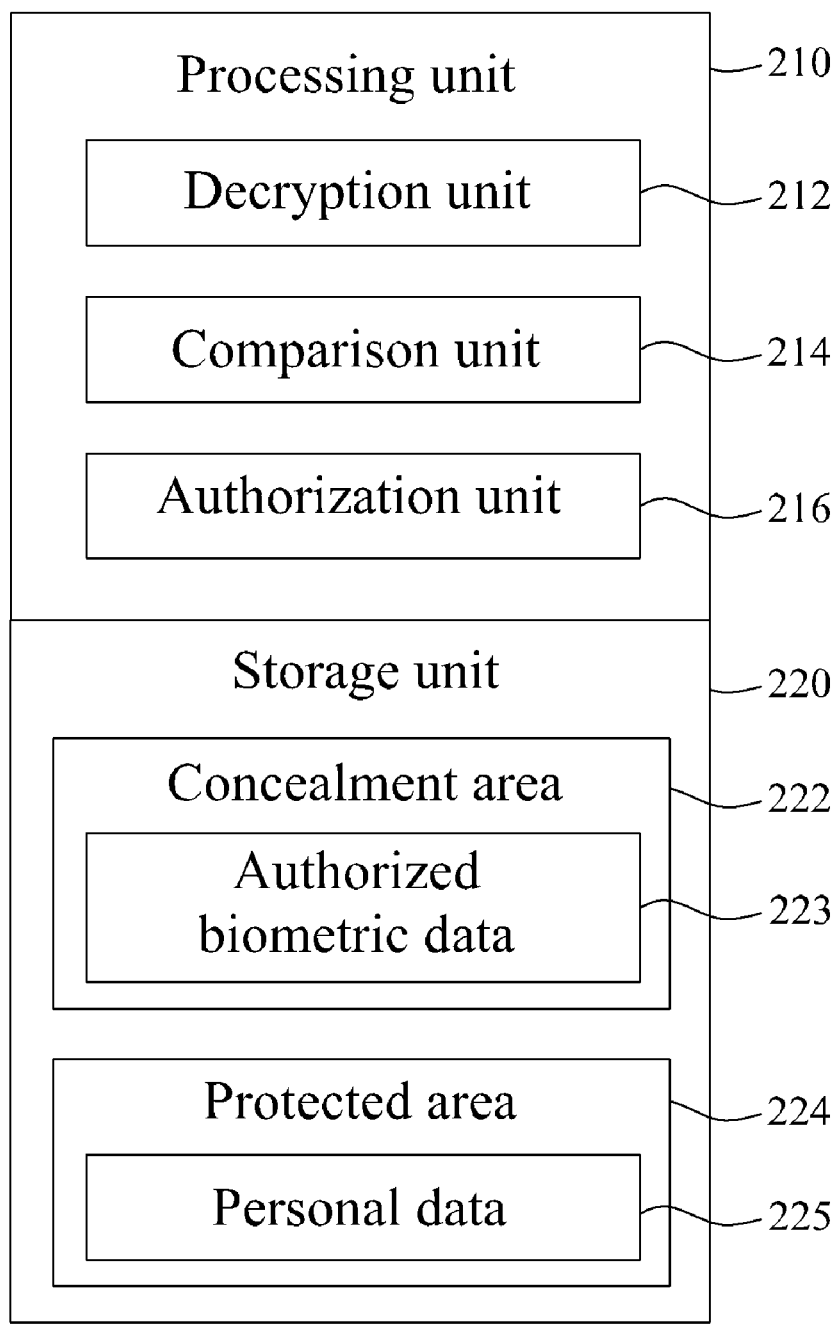
FIG. 3 is a block diagram of the portable storage apparatus of FIG. 1.

As shown in FIG. 3, the portable storage apparatus 200, such as a digital still camera or mobile phone, includes a processing unit 210 and a storage unit 220. The storage unit 220 includes a concealment area 222 and a protected area 224. The protected area 224 is configured for storing personal data 225.

The concealment area 222 is configured for storing a library of authorized biometric data 223 such as fingerprints. The authorized biometric data 223 are preset by the manufacturer or set by the user during setup of the portable storage apparatus 200.

The processing unit 210 includes a decryption unit 212, a comparison unit 214, and an authorization unit 216. The decryption unit 212 is configured for decrypting the encrypted biometric data.

The comparison unit 214 compares the input biometric data to the authorized biometric data. If no match is found, access to the portable storage apparatus 200 is denied.

The authorization unit 216 authorizes access to the protected area 224 to read and store the personal data 225 if a match is achieved.

Figure 4:
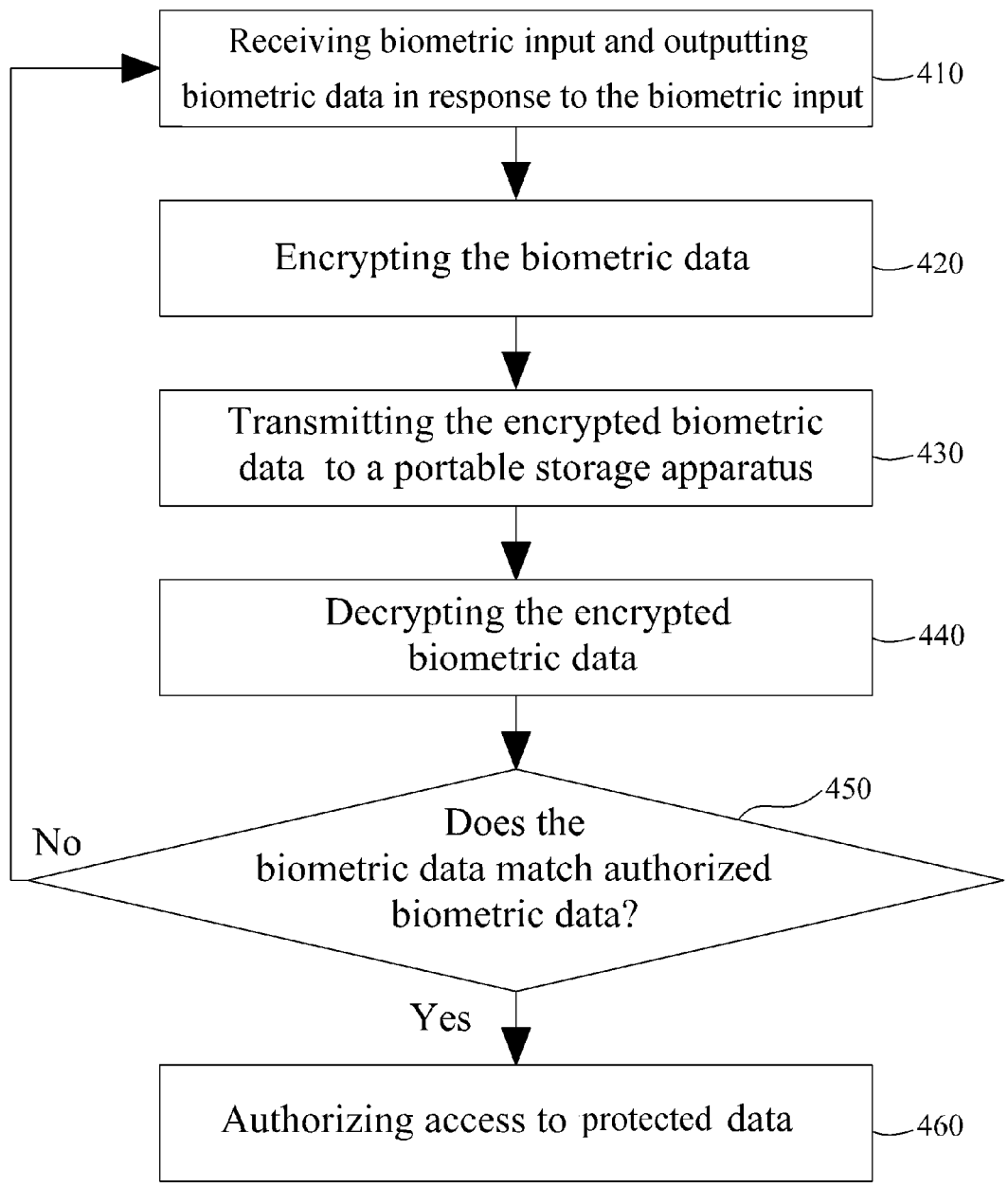
FIG. 4 is a flowchart of a biometric data transmission and verifying method according to a second exemplary embodiment.

FIG. 4 shows a flowchart of a method of transmitting and verifying biometric identification related to the data transmission device 100 of FIG. 1 according to a second embodiment.

In step 410, a biometric data input, such as a scanned fingerprint is received by the biometric sensor 131. In addition, a biometric data signal is output in response to the biometric input.

In step 420, the biometric data is encrypted for transmission.

In step 430, the encrypted biometric data is transmitted to the portable storage apparatus 200 via the first IO unit 110.

In step 440, the encrypted biometric data is decrypted by the decryption unit 212.

In step 450, the decrypted biometric data is compared to the library of the authorized biometric data 223 by the comparison unit 214. If a match is achieved, step 460 is performed. If the biometric data does not match any one of the authorized biometric data 223, access to the protected area 224 is denied by the authorization unit 216 and step 410 is repeated.

In step 460, access to the protected data 224 is authorized by the authorization unit 216. In detail, the user gets authorization to read the personal data 225 stored in the protected area 224 and also can store the personal data 225 therein.

It is to be noted that, while in practice, the data transmission device 100 can be a cable, but can alternatively be a wireless device with a transmitter having BLUETOOTH protocol or infrared (IR) protocol and thereby the portable storage apparatus 200 has a receiving unit configured for receiving the biometric data signal transmitted from the transmitter. The transmitter and the receiver have the same protocol.

It will be understood that the above particular embodiments are described and shown in the drawings by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A data transmission system, comprising:
   a computer;
   a portable storage apparatus; and
   a data transmission device interconnected to the portable storage apparatus and the computer, comprising:
      a first input-output unit configured for electrically connecting to the computer, wherein the first input-output unit is an interface conforming to the Universal Serial Bus standard;

a second input-output unit configured for electrically connecting to the portable storage apparatus, wherein the second input-output unit is an interface conforming to the Universal Serial Bus standard; and a biometric identification unit configured for electrically interconnecting the first input-output unit and the second input-output unit, the biometric identification unit comprising a biometric sensor and an encryption unit, the biometric identification unit receiving a biometric input and outputting biometric data in response to the biometric input, and the encryption unit encrypting the biometric data to be transmitted to the portable storage apparatus, the encryption being controlled by the computer.

2. The data transmission system of claim 1, wherein the first and second input-output units are a male or female plug depending on an interface type of a corresponding port to be connected to.

3. A data transmission system, comprising:
a computer;
a portable storage apparatus comprising a processing unit and a storage unit, the processing unit comprising a decryption unit, a comparison unit, and an authorization unit, the storage unit storing a library of authorized biometric data; and
a data transmission device interconnected to the portable storage apparatus and the computer, comprising:
a first input-output unit configured for electrically connecting to the computer, wherein the first input-output unit is an interface conforming to the Universal Serial Bus standard;
a second input-output unit configured for electrically connecting to the portable storage apparatus, wherein the second input-output unit is an interface conforming to the Universal Serial Bus standard; and
a biometric identification unit configured for electrically interconnecting the first input-output unit and the second input-output unit, the biometric identification unit comprising a biometric sensor and an encryption unit, the biometric identification unit receiving a biometric input and outputting biometric data in response to the biometric input, and the encryption unit encrypting the biometric data to be transmitted to the portable storage apparatus, the encryption being controlled by the computer,
wherein the decryption unit of the portable storage apparatus is configured to decrypt the encrypted biometric data, the comparison unit is configured to compare the decrypted biometric data with the library of the authorized biometric data, and the authorization unit is configured to authorize or deny access to protected data in the storage unit.

* * * * *